July 31, 1951     M. A. STARR     2,562,341
ALTERNATING AZIMUTH SWEEP
Filed Oct. 30, 1945
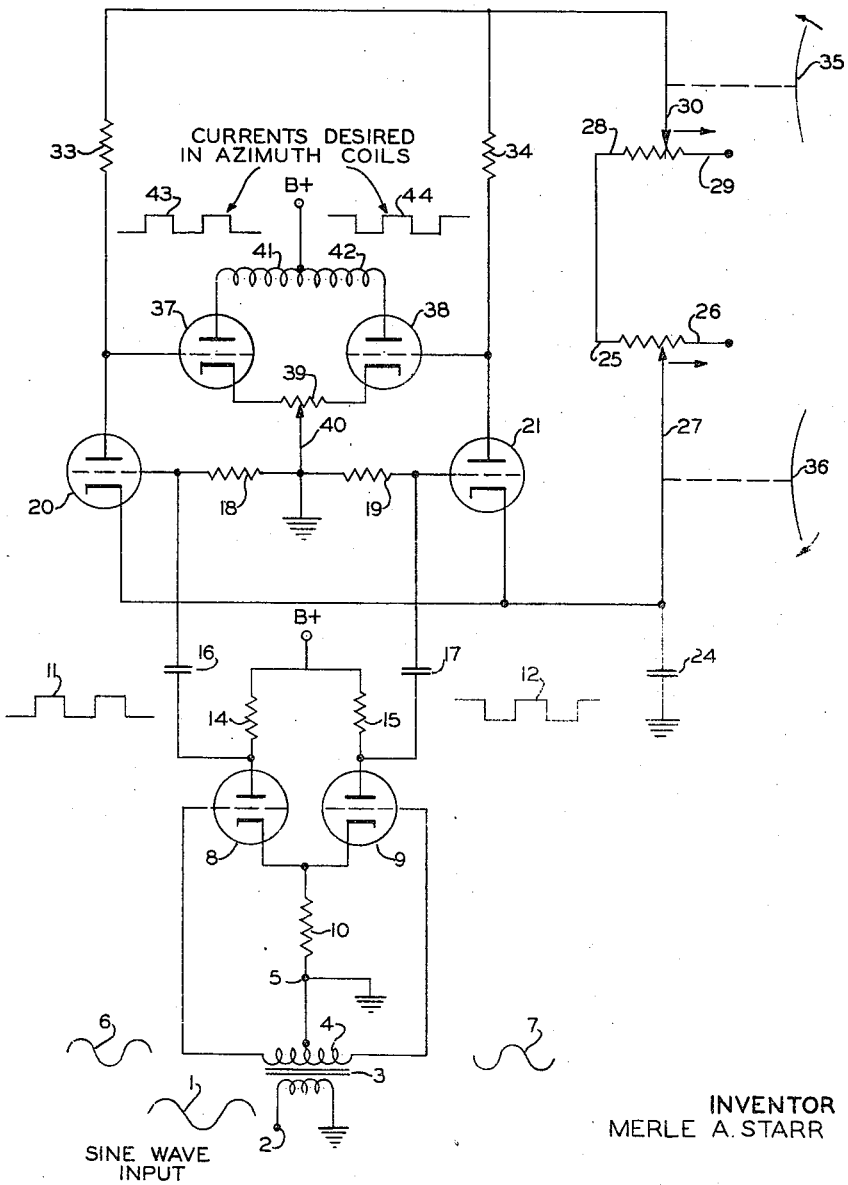
ALTERNATING AZIMUTH SWEEP
INVENTOR
MERLE A. STARR
BY *Ralph L. Chappell*
ATTORNEY Patented July 31, 1951

2,562,341

UNITED STATES PATENT OFFICE 2,562,341

ALTERNATING AZIMUTH SWEEP

Merle A. Starr, Belmont, Mass., assignor, by mesne assignments, to the United States of America as represented by the Secretary of the Navy Application October 30, 1945, Serial No. 625,667

5 Claims. (Cl. 343—113)

This invention relates to electric sweep circuits and more particularly to an alternating sweep for presenting azimuth information on a B-scan indicator of a radar system.

For the usual radar system B-scan presentation on a cathode ray tube, hereinafter referred to as CRT, the azimuth sweep of the CRT follows the orientation of the antenna in its scanning operation.

The present invention applies particularly to a two reflector antenna system where the azimuth angle between the reflectors is varied continuously so that their beams are swept first apart and then together in azimuth scanning. Using a CRT as the indicating means, the CRT beam must jump from side to side horizontally on the screen and the magnitude of the beam's excursions from the center of the screen must be correlated with the angle between the reflectors. This is accomplished by applying to the horizontal deflection coils of the CRT periodic square waves which are 180° out of phase and whose amplitudes correspond to the angle between the reflectors and are controlled by potentiometers linked to the reflectors. Range information is plotted vertically as usual on the B-scan.

An object of this invention is to provide a sweep circuit for generating phase opposed periodic square waves which are amplitude modulated in a predetermined manner.

Another object is to provide a method of presenting information on a B-scan concerning the azimuth angle between two reflectors and the azimuth sweep of their radar beams.

Another object is to provide apparatus for indicating visually the azimuth sector being scanned by a two reflector antenna system.

These and other objects and features of this invention will become apparent upon consideration of the following detailed description when taken together with the accompanying drawing, which illustrates a typical embodiment of this invention.

The figure illustrates the sweep circuit producing amplitude modulated square waves applied to the azimuth deflection coils of the cathode ray tube. The dotted lines to the reflectors indicate that the potentiometer arms are driven by mechanical linkage to the reflectors.

In the figure, an alternating current sinusoidal wave 1 is applied to primary winding 2 of transformer 3. The secondary 4 of transformer 3 is center-tapped to ground at 5 so that the voltages 6 and 7 at either end of the secondary winding 4 are 180° out of phase. The voltages 6 and 7 are applied to the control grids of tubes 8 and 9 respectively. The cathodes of 8 and 9 are grounded through resistor 10 and the plates receive B+ through resistors 14 and 15 respectively. Tubes 8 and 9 are overdriven so that their plate output wave forms 11 and 12 are substantially squared waves. Output wave 11 is 180° out of phase with wave 12 but both are of the same frequency as wave 1. Wave 11 is applied through capacitor 16 to the control grid of tube 20 which is grounded through resistor 18. Wave 12 is applied through capacitor 17 to the control grid of tube 21 which is grounded through resistor 19. The cathodes of tubes 20 and 21 are connected together and to one end of capacitor 24 whose other end is grounded. The cathodes are also connected to slider arm 27 and are biased by voltage tapped off by slider arm 27 of potentiometer 25, one end of which is tied at 26 to a source of negative voltage and the other end of which connects to one end of potentiometer 28. The other end of potentiometer 28 connects to a source of positive potential at point 29 and its slider arm 30 supplies positive potential through resistor 33 to the plate of tube 20 and through resistor 34 to the plate of tube 21. Sliders 27 and 30 are driven by mechanical linkage by reflectors 35 and 36 on the antenna so that when the reflectors sweep out from the center, sliders 27 and 30 sweep towards the right as indicated by the arrows on the figure.

The plates of tubes 20 and 21 are also tied to the control grids of tubes 37 and 38 respectively, between whose cathodes is connected potentiometer 39, having a slider arm 40 which is grounded. B+ is supplied to the plate of tube 37 through the CRT azimuth deflection coil 41 and to the plate of tube 38 through the second azimuth deflection coil 42. The periodic current wave forms 43 and 44 are the plate outputs of tubes 37 and 38 appearing in deflection coils 41 and 42 respectively and have the frequency of the sinusoidal input wave 1.

In one method of operation of the two reflector scanner system, the radar beam is transmitted alternately from the reflectors and from only one reflector at a time. The sinusoidal wave 1 has the frequency of the switching of the beam from one reflector to the other. This wave is passed through transformer 3 and through the overdriven tubes 8 and 9 and the resulting squared waves 11 and 12 are applied to the control grids of tubes 20 and 21. The control grids of tubes 37 and 38 are held at a positive potential determined by the circuit back to point 29, except when clamped to a lower potential by the conduction of tube 20 and 21. The lower potential is then determined by the loop circuit between points 29 and 26.

When the tube 20 is conducting on the positive pulse of wave 11, the control grid of tube 37 drops in potential and hence the current in tube 37 decreases. Meanwhile tube 38 is conducting vigorously. On the next half cycle of the input wave 1 when the transmitted beam is switched from one reflector to the other, tube 21 conducts on the positive pulse of wave 12, dropping the control grid potential of tube 38 and thus decreasing the current in tube 38. Now tube 37 is conducting vigorously. As a result of this action, the currents with wave forms 43 and 44 appear in the azimuth deflection coils of the CRT and the electron beam is pulled from one side of the screen to the other at each half cycle to correspond to the switching of the radar beam from one reflector to the other.

The amplitude of the square wave pulses of wave forms 43 and 44 is increased by increasing the positive potential on the control grids of tubes 37 and 38 when tubes 20 and 21 are non-conducting and by decreasing the potential to which the control grids of 37 and 38 are clamped when tubes 20 and 21 do conduct. This is accomplished by changing the voltages available from points 29 and 26 through the slider arms 30 and 27 of potentiometers 28 and 25.

Sliders 30 and 27 are driven by linkage from the reflectors 35 and 36 of the antenna system, so that when the reflectors sweep out from the center, sliders 30 and 27 sweep towards the right in the figure. This provides amplitude modulation of the net current through the deflection coils of the CRT, so that the motion of the CRT beam corresponds to the motion of the reflectors and of the radar beam, as desired.

In the foregoing description, the CRT is used conventionally as the means of indicating the position of the radar beam. There are of course other means of measuring the voltage variations of the amplitude modulated square waves to indicate the beam's position.

Although there is shown and described herein only a certain specific embodiment of this invention, the many modifications possible thereof will be readily apparent to those familiar with the art. Therefore this invention is not to be limited except insofar as is necessitated by the prior art and the spirit of the appended claims.

What is claimed is:

1. An electric sweep generator for generating periodic, phase opposed, amplitude modulated square waves, comprising, a source of alternating current waves, limiting means for deriving from said alternating waves two substantially squared waves in phase opposition, two electronic switches triggered alternately by said substantially squared waves, positive and negative potential sources, two electron tubes for providing said periodic square waves, each having an output circuit for said periodic square waves, and a control grid, said grids being connected alternately by said switches to said sources of positive and negative potential, said sources including potential varying means for producing the modulation in amplitude of said periodic square waves in the said output circuits.

2. Apparatus having a cathode ray tube for indicating visually the continually varying azimuth angle between two radar antenna reflectors which transmit alternately, comprising azimuth deflection coils for said cathode ray tube, a sweep generator applying to said coils phase opposed square waves for deflecting said cathode ray tube's beam from one side to the other, potentiometers for varying the amplitudes of said square waves respectively, and means to actuate said potentiometers from said reflectors, whereby the amplitude of said square wave varies as the azimuth angle between said reflectors varies.

3. Apparatus having a cathode ray tube for indicating visually the continually varying azimuth angle between two radar antenna reflectors which radiate alternately, comprising azimuth deflection coils for said cathode ray tube, a sweep generator applying to said coils phase opposed square waves for deflecting said cathode ray tube's beam from side to side, potentiometers for varying the amplitudes of said square waves respectively, means to actuate said potentiometers from said reflectors whereby the amplitude of said square wave varies as the azimuth angle between said reflectors varies, and means to synchronize the generation of said square waves with the alternate radiation from said reflectors.

4. In apparatus having a cathode ray tube for indicating the continually varying angle between two radar antenna reflectors which transmit alternately, a horizontal sweep circuit comprising horizontal deflection coils for said cathode ray tube, switching means for controlling the flow of current in said coils, means synchronized to the alternate transmission from said reflectors to energize said switching means, and means responsive to the angular position of said reflectors to control the amplitude of current flowing in said coils.

5. In apparatus for indicating the continuously varying angle between two radar antenna reflectors which radiate alternately, a cathode ray tube sweep circuit comprising two deflection coils for said cathode ray tube, a source of power to energize said coils, means responsive to the angular position of said reflectors to control the amplitude of current flowing in said coils, and means operating in synchronism with the switching of radiation from one of said reflectors to the other for switching said energizing current from one of said coils to the other.

MERLE A. STARR.

REFERENCES CITED

The following references are of record in the file of this patent:

UNITED STATES PATENTS

| Number | Name | Date |
|---|---|---|
| 2,151,549 | Becker | Mar. 21, 1939 |
| 2,226,459 | Bingley | Dec. 24, 1940 |
| 2,231,929 | Lyman | Feb. 18, 1941 |
| 2,265,848 | Lewis | Dec. 9, 1941 |
| 2,401,432 | Luck | June 4, 1944 |